United States Patent [19]

Shuler

[11] Patent Number: 4,543,786
[45] Date of Patent: Oct. 1, 1985

[54] CONTROL SYSTEM FOR HYDROSTATIC TRANSMISSION

[75] Inventor: Lucien B. Shuler, Bettendorf, Iowa
[73] Assignee: Caterpillar Tractor Co., Peoria, Ill.
[21] Appl. No.: 513,548
[22] Filed: Jul. 14, 1983
[51] Int. Cl.$^4$ ............................................. B60K 41/20
[52] U.S. Cl. ........................................ 60/435; 60/436; 60/442; 60/441; 180/271
[58] Field of Search ................. 60/435, 436, 442, 441, 60/447, 449; 180/271, 307, 6.48; 417/217, 218

[56] References Cited

U.S. PATENT DOCUMENTS

| | | | |
|---|---|---|---|
| 3,830,594 | 8/1974 | Hein et al. | 417/217 |
| 4,310,078 | 1/1982 | Shore | 180/271 |
| 4,341,073 | 7/1982 | Spivey | 60/399 |
| 4,343,150 | 8/1982 | Shuler et al. | 60/399 |

Primary Examiner—Robert E. Garrett
Assistant Examiner—John M. Husar
Attorney, Agent, or Firm—John W. Grant

[57] ABSTRACT

Hydrostatic transmissions are commonly employed in the drive train of earthmoving and industrial vehicles. It is difficult to stop some such vehicles at a precise location on a slope due to the presence of a delay valve included in the controls for delaying application of a friction brake until the vehicle has been stopped by the hydrostatic transmission. In the present control system, a manual control valve (74) is moved to a first operative position and a hand control lever (25) is manipulated in combination therewith to reduce the displacement of a variable displacement pump (12) to establish a minimum drive condition sufficient to hold the vehicle motionless. Thereafter the manual control valve (74) can be moved to a second operative position to apply a friction brake (18) while the transmission maintains the vehicle motionless. In order to start the vehicle from the stopped position on a slope without unwanted roll, the transmission is either maintained at the minimum drive condition while the vehicle is stopped or the control lever (25) is manipulated to reestablish the minimum drive condition such that when the friction brake (18) is released by returning the control valve (74) to the first operative position, no undesired vehicle motion will occur. Normal vehicle motion may then resume by further manipulation of the control lever (25) and/or the manual control valve (74).

9 Claims, 1 Drawing Figure

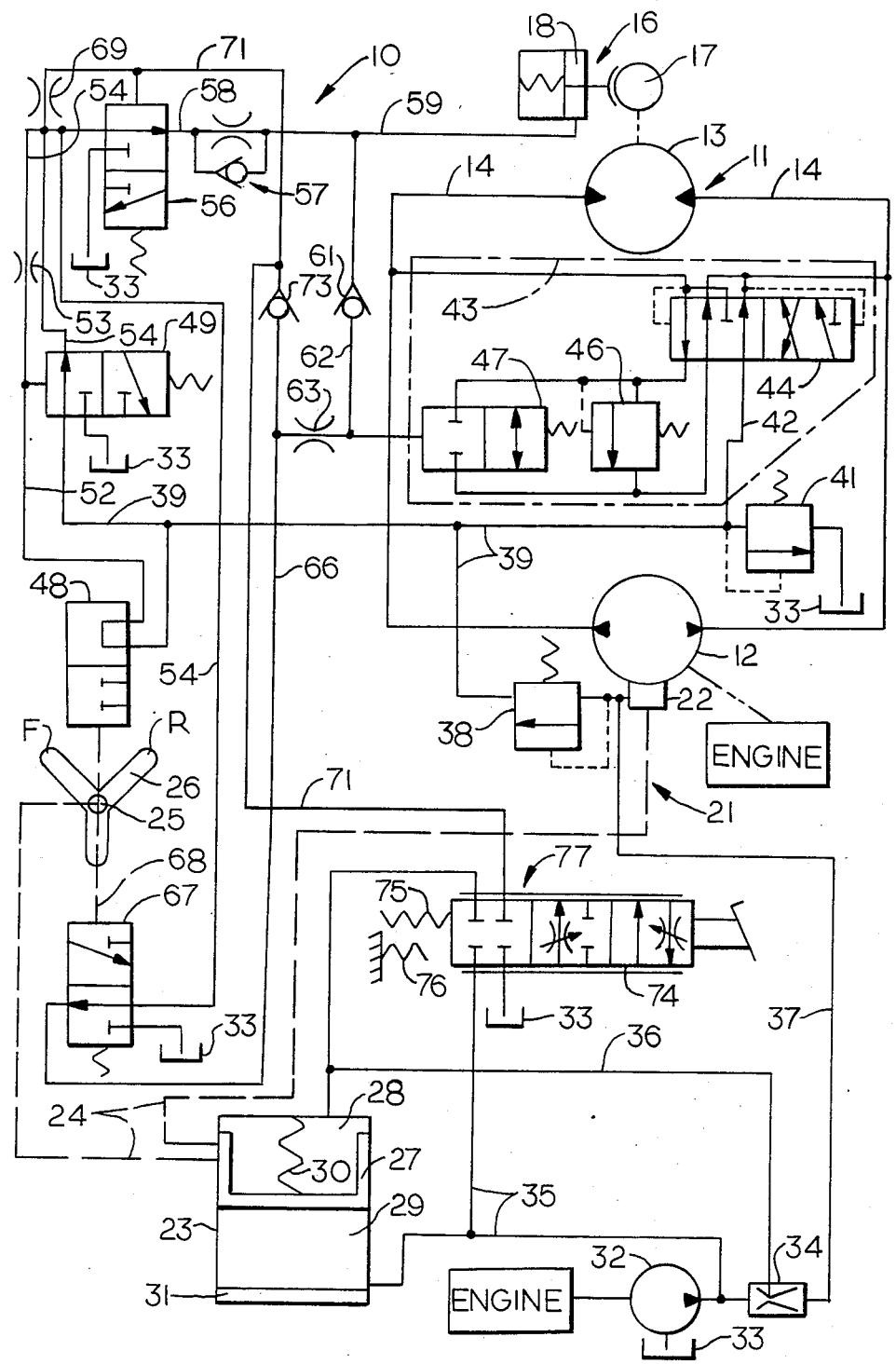

CONTROL SYSTEM FOR HYDROSTATIC TRANSMISSION

TECHNICAL FIELD

This invention relates to a control system for a hydrostatic transmission and more particularly to a control circuit for applying the brakes while the transmission is maintained in a predetermined minimum drive condition.

BACKGROUND ART

Some industrial vehicles, such as track-type loaders, having hydrostatic transmissions utilize the transmission for dynamic braking and employ a separate friction brake to hold the machine once the vehicle has been stopped. Such vehicles frequently have a delay valve device in the control system to ensure that the friction brake is not applied until the vehicle has come to a complete stop. Such control systems also frequently have a shunt valve therein to short circuit the closed loop between the pump and motor thereof as a further measure to ensure that the hydrostatic transmission is completely neutralized anytime the friction brake is applied. Such a system is disclosed in U.S. Pat. No. 3,341,073 issued to William J. Spivey, Jr. on July 27, 1982 and U.S. Pat. No. 4,343,150 issued to Shuler et al on Aug. 10, 1982.

While such controls function satisfactorily in most work situations normally associated with track-type loaders, there is at least one work situation encountered in which the delay in applying the friction brakes causes some minor inconveniences. For example, if the vehicle is being stopped on a slope, the delay in applying the friction brakes after the transmission has been neutralized can allow the vehicle to roll down the slope from 2-9 centimeters before the friction brakes engage due to internal leakage in the pump and motor of the hydrostatic transmission. Similarly, while starting vehicle motion from a brakes applied stopped position, the process of releasing the friction brake and simultaneously engaging the hydrostatic drive can permit the vehicle to roll down the slope from 2-30 centimeters before the vehicle can respond completely to operator inputs. While such roll is not normally noticeable or objectionable, it can be an inconvenience if the operator is trying to stop the vehicle at a very precise location on the slope or start the vehicle moving without it rolling down the slope before the transmission is actuated.

The present invention is directed to overcoming one or more of the problems as set forth above.

DISCLOSURE OF THE INVENTION

In one aspect of the present invention a control system is provided for a hydrostatic transmission. The hydrostatic transmission includes a variable displacement pump hydraulically connected to a hydraulic motor, a hydraulically actuated friction brake operatively connected to the hydraulic motor and displacement control means for varying the displacement of the variable displacement pump. The control system includes valve means for destroking the variable displacement pump to establish a predetermined minimum drive condition of the hydrostatic transmission and for applying and releasing the friction brake while the transmission is maintained in the predetermined minimum drive condition.

The present invention provides a control system for hydrostatic transmissions with which the friction brake can be applied or released while the transmission is maintained in a predetermined minimum drive condition. This permits an operator operating a vehicle having a hydrostatic transmission to stop the vehicle at a precise location on a slope and thereafter start the vehicle moving instantly in response to operator input.

BRIEF DESCRIPTION OF THE DRAWING

The sole FIGURE is a schematic representation of an embodiment of the present invention.

BEST MODE FOR CARRYING OUT THE INVENTION

Referring now to the drawing, a control system is generally indicated by the reference numeral 10 and associated with a hydrostatic transmission 11. The hydrostatic transmission 11 includes a reversible variable displacement pump 12 hydraulically connected to a hydraulic motor 13 by a pair of conduits 14 in a closed loop fashion. A hydraulically actuated friction brake 16 is operatively associated with an element 17 operatively connected to the hydraulic motor 13. The brake 16 is a spring applied hydraulically released brake having an actuating chamber 18.

A displacement control means 21 is operatively connected to the variable displacement pump 12 for varying the displacement thereof. The displacement control means 21 includes a servo system 22 and an underspeed actuator 23 connected to the servo system through a mechanical linkage illustrated by a dashed line 24. The mechanical linkage 24 also connects the underspeed actuator to a control lever 25 which is movable in a Y-shaped pattern 26. The underspeed actuator 23 is of the type fully disclosed in U.S. Pat. No. 3,952,514 issued to Cyril W. Habiger on Apr. 27, 1976. Generally the underspeed actuator 23 includes a piston 27 and upper and lower actuating chambers 28, 29 respectively. A spring 30 is positioned in the upper actuating chamber 28 for resiliently biasing the piston 27 downwardly as viewed in the drawing. A spacer 31 is provided for limiting the downward movement of the piston. Alternatively, the spacer 31 could be omitted and the bore in the underspeed actuator made shorter.

A source of pressurized fluid such as a fixed displacement pump 32 draws fluid from a reservoir 33 and is connected to an upstream side of a venturi 34 and to the actuating chamber 29 through a conduit 35. The throat of the venturi 33 is connected to the upper actuating chamber 28 through a conduit 36. A conduit 37 connects the downstream side of the venturi 33 to the servo system 22 and to a relief valve 38 which maintains the pressure in the conduit 37 at a predetermined operating level.

A conduit 39 connects the downstream side of the relief valve 38 to a relief valve 41 and an inlet port 42 of a combination relief, replenishing and shunt valve 43. The relief valve 41 maintains the pressure in the conduit 39 at a predetermined level lower than the predetermined level in conduit 37. The valve 43 is connected to both main conduits 14 and includes a shuttle valve 44, a system relief valve 46 and a pilot operated shunt valve 47.

The conduit 39 is also connected to a pilot valve 48 and a pilot actuated reset valve 49. The pilot valve 48 is mechanically connected to the control lever 25 through a linkage illustrated by the dashed line 51. A conduit 52 connects the pilot valve with an end of the pilot actuated reset valve 49 and to an orifice 53. A conduit 54 is connected to the reset valve 49 and the orifice 53 and to a pilot actuated brake valve 56. A delay valve 57 is connected to the brake valve 56 through a conduit 58 and to the actuating chamber 18 of the brake 16 through a conduit 59. The conduit 59 is connected to an upstream side of a check valve 61. A conduit 62 is connected to the downstream side of the check valve 61, the end of the shunt valve 47 and to an orifice 63. A conduit 66 connects the other side of the orifice 63 with a neutralizing valve 67 which has its other side connected to the conduit 54. The neutralizing valve 67 is mechanically connected to the control lever 26 through a mechanical linkage illustrated by a dashed line 68. Alternatively, the neutralizing valve 67 can be a solenoid actuated valve which is actuated when the control lever 25 is moved to the bottom leg of the Y pattern 26.

An orifice 69 has one side connected to the conduit 54 while its other side is connected by a conduit 71 to the end of the brake valve 56. The conduit 71 is also connected to the upstream side of a check valve 73 and to a manual control valve 74. The downstream side of the check valve 73 is connected to the conduit 66. The conduits 36 and 35 are connected to opposite sides of the control valve 74. A return spring 75 and a bumper spring 76 are connected to one end of the control valve 74.

The relief valve 41, reset valve 49, brake valve 56, neutralizing and brake valve 67 and control valve 74 are all commonly connected to the reservoir 33 in the usual manner.

The control valve 74 and the brake valve 56 constitute a valve means 77 for destroking the variable displacement pump 12 to establish a predetermined minimum drive condition of the hydrostatic transmission 11 and applying the friction brake 16 while the hydrostatic transmission is maintained in the predetermined minimum drive condition.

INDUSTRIAL APPLICABILITY

In use, the control system 10 is functional to control the output speed and torque of the hydralic motor 13 of the hydrostatic transmission 11 by controlling the displacement of the variable displacement pump 12. The control system 10, as illustrated in the drawing, is representative of a condition in which the engine is driving the pumps 12 and 32 and the control lever 25 is in the position shown. In such condition, the piston 27 of the underspeed actuator 23 is positioned as shown (zero underspeed position) by virtue of a pressure differential generated in the conduits 35 and 36 due to fluid flow from the pump 32 passing through the venturi 33. With the piston 27 in the position shown, movement of the control lever 25 upwardly in either of the angled legs of the Y pattern will vary the displacement of the variable displacement pump 12 from a zero displacement condition to a maximum displacement condition. The angled legs are labeled "F" and "R" to represent forward and reverse drive conditions respectfully. When the control lever 25 is in one of its maximum speed positions, movement of the piston 27 of the underspeed actuator 23 downwardly as viewed in the drawing causes a proportional decrease in the displacement of the variable displacement pump 12. At the lowermost position of the piston 27, the pump displacement will be at approximately 10% of its maximum displacement.

The combination of the pilot valve 48 and the reset valve 49 is operative to prevent inadvertent power output from the hydraulic motor 13 of the hydrostatic transmission 11 should the engine be started with the control lever 25 already positioned in either of the angled legs of the Y pattern. Specifically, if the engine is started with the control lever 25 in either one of the angled legs, the pilot valve 48 will be positioned to block fluid flow between conduits 39 and 52 thereby preventing actuation of the reset valve 49. With the reset valve 49 in its spring biased position, pressurized pilot fluid is blocked from the conduit 54, and hence the conduits 66, 62 and 71, so that the brake valve 56 and the shunt valve 47 remain in their spring biased positions. At the spring biased position of the brake valve 56, the conduit 59 and the actuation chamber 18 are vented to the reservoir 33 so that the brake remains applied. At the spring biased position of the shunt valve 47 the main conduits 14 of the hydrostatic transmission are short circuited.

However, once the control lever 25 is moved to the neutral position shown, the pilot valve 48 is moved to the position communicating pilot fluid from the conduit 39 to the conduit 52. The orifice 53 is sized to generate a pressure in the conduit 52 sufficient to shift the reset valve 49 to the position shown which then directly communicates the conduit 39 with the conduit 54 so that the conduit 54 becomes a source of pressurized pilot fluid. The pilot fluid in the conduit 54 passes through the neutralizing valve 67 and the conduits 66 and 62 as a pilot signal to actuate the shunt valve 47 to the blocking position shown. Simultaneously therewith, fluid from the conduit 54 passes through the orifice 69 into the conduit 71. With the manual control valve 74 in the fluid blocking position shown, fluid pressure builds up in the conduit 71 causing the brake valve 56 to be moved from the spring biased position to the position shown at which conduit 54 is connected to the conduit 58 to direct pilot fluid through the delay valve 57 and the conduit 59 to the actuating chamber 18 to release the friction brake 16. The control system is now in a condition whereby moving the control lever 25 upwardly in either of the angled legs of the Y pattern results in an output displacement from the variable displacement pump 12 to drive the motor 13.

Movement of the control lever 25 downwardly in the bottom leg of the Y-shaped pattern 26 moves the neutralizing valve 67 from the spring biased position to a position at which communication is blocked between the conduits 54 and 66 while simultaneously communicating the conduit 66 with the reservoir. Venting the conduit 66 effectively vents the conduits 62 and 59 and the actuating chamber 18 to simultaneously apply the friction brake 16 and move the shunt valve 47 to a position interconnecting the main conduits 14.

To utilize the control system 10 for stopping a vehicle having the hydrostatic transmission 11 mounted thereon on a slope, the control lever 25 may be moved to an intermediate speed position to initially reduce the displacement of the variable displacement pump 12. The manual control valve 74 is then progressively moved to the first operative position at which the bumper spring 76 is engaged. At this position of the manual control valve, the conduits 36 and 35 are interconnected so that the pressure in the actuating chambers 28 and 29 of the underspeed actuator 23 is essentially the same allowing the spring 30 to move the piston 27 downwardly against the spacer 31 to establish a low drive condition of the hydrostatic transmission 11 as determined by the position of the control lever 25. At this time, the operator will manipulate the control lever 25 to establish a predetermined minimum drive condition sufficient to hold the vehicle motionless on the slope. The manual control valve 74 is then moved to a second operative position at which the conduit 71 is vented to the reservoir. Venting the conduit 71 allows the brake valve 56 to return to its spring biased position at which the conduits 58 and 59 and the actuating chamber 18 of the friction brake are vented to the reservoir thereby applying the friction brake 16. Moving the control valve 74 from the first operative position to the second operative position does not change the predetermined drive condition of the hydrostatic transmission. Thus, the friction brake 16 is effectively applied while the transmission is maintained in the predetermined minimum drive condition.

If the machine is to be maintained in the stopped position for any appreciable period of time, the control lever 25 can be moved to the neutral position to establish a zero displacement of the variable displacement pump 12 to prevent heat generation in the hydraulic fluid. To prevent unwanted roll of the vehicle when movement of the vehicle is started from the stopped position on a slope, the control lever 25 is moved in the appropriate direction to establish a drive condition of the hydrostatic transmission 11 prior to moving the manual control valve 74 from the second operative position.

In view of the foregoing, it is readily apparent that the structure of the present invention provides an improved control system for a hydrostatic transmission with which a vehicle having such hydrostatic transmission can be stopped at a precise location on a slope and subsequently started without unwanted roll. This is accomplished through the utilization of a valve means with which the variable displacement pump of the hydrostatic transmission can be destroked to establish a predetermined minimum drive condition of the transmission and thereafter applying the friction brake while the transmission is maintained in the predetermined minimum drive condition. Thus, the control system can be manipulated to obtain a minimum drive condition sufficient to counteract the tendency for the vehicle to roll down the slope. Once this is achieved, the friction brake can then be applied without upsetting the minimum drive condition of the vehicle. Furthermore, any slight delay in application of the friction brake would not be detrimental since the transmission would hold the vehicle at the precise location until the friction brakes are fully engaged. Similarly, with the hydrostatic transmission in the preselected minimum drive condition, the vehicle will either remain at the stopped position or instantly start moving in the desired direction when the friction brake is released in response to an operator input to move the vehicle.

Other aspects, objects and advantages of this invention can be obtained from a study of the drawings, the disclosure and the appended claims.

I claim:

1. A control system (10) for a hydrostatic transmission (11) having a variable displacement pump (12) hydraulically connected to a hydraulic motor (13), a hydraulically actuated friction brake (16) operatively connected to the hydraulic motor (13) and displacement control means (21) for varying the displacement of the variable displacement pump between zero and maximum displacement positions, comprising:

valve means (77) for destroking the variable displacement pump to a minimum displacement position greater than zero to establish a predetermined minimum drive condition of the hydrostatic transmission (11) and for applying and releasing the friction brake (16) while the hydrostatic transmission (11) is maintained in said predetermined minimum drive condition.

2. The control system as set forth in claim 1, wherein said displacement control means (21) includes an underspeed actuator (23) operatively connected to the variable displacement pump (12) and adapted to establish a predetermined displacement of the variable displacement pump in response to a predetermined pressure differential imposed on opposite ends thereof, said valve means (77) including a manual control valve (74) connected to the underspeed actuator (23) and to the friction brake (16) and movable from a blocking position to a first operative position at which the predetermined pressure differential imposed on the underspeed actuator (23) is altered and to a second operating position at which said altered pressure differential on the underspeed actuator is maintained and the friction brake (16) is applied.

3. The control system of claim 2 wherein said underspeed actuator (23) is movable between a zero underspeed position at which maximum displacement of the variable displacement pump (10) is established and a full underspeed position at which the minimum displacement of the variable displacement pump is established.

4. The control system as set forth in claim 3, wherein said friction brake (16) is a spring applied hydraulically released brake having an actuating chamber (18), said valve means (77) being operative to relieve the hydraulic pressure in the actuating chamber (18) of the brake at the second operative position of the control valve (74).

5. The control system as set forth in claim 4 including a source of pressurized pilot fluid (54,32), and wherein said valve means (77) includes a pilot operated brake valve (56) connected to the source of pilot fluid (32) and to the actuating chamber (18), said brake valve (56) being movable to a first position at which pilot fluid is transmitted to the actuating chamber (18) and a second position at which the actuating chamber is vented, said brake valve (56) being moved to the first position in response to a pilot signal directed to an end thereof and biased to the second position when said pilot signal is removed.

6. The control system as set forth in claim 5, wherein said control valve (74) is connected to the end of the brake valve (56) and adapted to vent the pilot signal therefrom at its second operative position.

7. The control system as set forth in claim 6 wherein said hydrostatic transmission (11) includes a pair of conduits (14) connecting the variable displacement pump (12) with the motor (13) and a pilot operated shunt valve (47) connected between the conduits (14) and movable between an open position at which the conduits (14) are interconnected and a blocking position at which the conduits (14) are blocked from one another, said shunt valve (47) being movable to the blocking position in response to a pilot signal directed thereto and to the open position in the absence of the pilot signal, said control system further including a neutralizing valve (67) connected to the source of pressurized pilot fluid and to an end of the shunt valve (47) and an end of the brake valve (56), said neutralizing valve (67) being movable between a first position at which a pilot signal is directed to the end of the shunt valve (47) and a second position at which the pilot signals at both the shunt valve (47) and the brake valve (56) are vented.

8. The control system (10) as set forth in claim 7 including a check valve (73) connected to the ends of the shunt valve (47) and the brake valve (56) and adapted to maintain the pilot signal at the shunt valve (47) when the control valve (74) is at the second operative position and the neutralizing valve (67) is at the first position.

9. The control system (10) as set forth in claim 8 including another check valve (61) connected to the end of the shunt valve (47) and to the actuating chamber (18) of the friction brake (16) and adapted to maintain the pilot signal at the shunt valve when the brake valve (56) is at its second position and the neutralizing valve (67) is at its first position.

* * * * *